F. J. ROBINSON.
TRICK BLOCK.
APPLICATION FILED APR. 10, 1912.
1,052,277.
Patented Feb. 4, 1913.
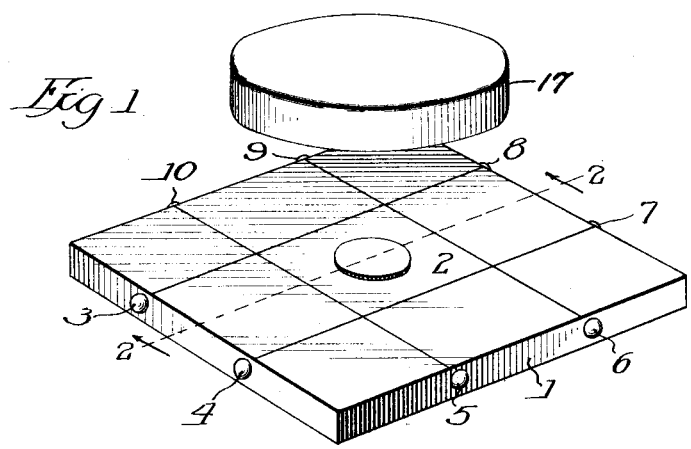
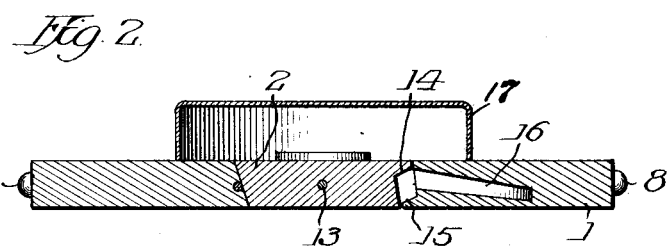
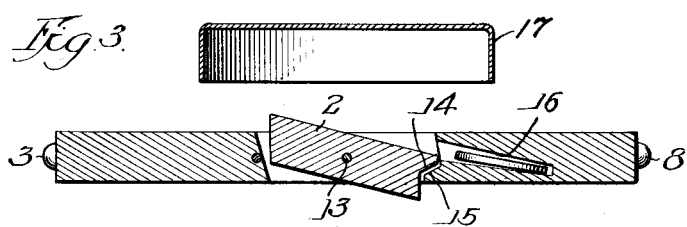
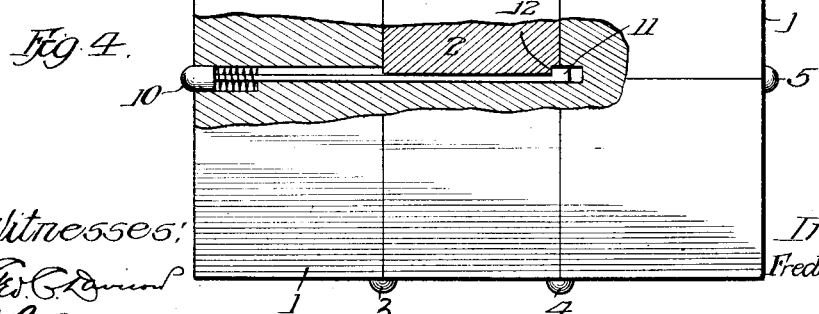
Witnesses:
Inventor:
Frederick J. Robinson
By Borton & Falk
Attys.

UNITED STATES PATENT OFFICE.

FREDERICK JAMES ROBINSON, OF LACKAWANNA, NEW YORK.

TRICK-BLOCK.

1,052,277.  Specification of Letters Patent.  Patented Feb. 4, 1913.

Application filed April 10, 1912. Serial No. 689,813.

*To all whom it may concern:*

Be it known that I, FREDERICK J. ROBINSON, a citizen of the United States, residing at Lackawanna, in the county of Erie and State of New York, have invented a certain new and useful Improvement in Trick-Blocks, of which the following is a full, clear, concise, and exact description.

My invention relates to that class of toys or amusement apparatus in which a coin, as, for example, a ten-cent piece or other token, is made to disappear and appear as it were by magic for the purpose of entertainment.

Speaking generally my invention comprises a block which may be held in the hand of the user and which is provided with a pivoted trap, adapted to be tilted to deposit a coin laid thereon in a concealed pocket. This trap or coin platform is preferably placed centrally of the block so as to occupy a central square, the joints of the square appearing as lines of division which are indicated on the block to give a checker-board appearance. The fact of there being a trap is thus obscured.

I provide a shoulder for limiting the swing of the trap and also a suitable locking device controlled by a rod, which locking device is concealed from the observer; the deception being made complete by making the push button of the rod correspond in shape with the heads of tacks which are placed symmetrically therewith in the edges of the block.

My invention will be more readily understood by reference to the accompanying drawings, in which—

Figure 1 is a perspective view of my trick block, with a coin on the top and the cap or cover ready to be placed over the coin to conceal the same; Fig. 2 is a longitudinal, central section on line 2—2 of Fig. 1; Fig. 3 is a similar view, the cap being shown lifted, the trap tilted and the coin in the pocket; and Fig. 4 is a view illustrating the locking device for the trap.

Like parts are indicated by similar letters of reference in the different figures.

The block 1 may consist as shown of wood or fiber or like material, and is marked off into squares as shown, the trap 2 being preferably at the center, the tack heads 3, 4, 5, 6, 7, 8, 9 and the button 10 of the locking device being arranged as shown in symmetrical positions in the edges of the block.

As shown more clearly in Fig. 4 the locking device consists of a spring-actuated latch rod provided with said button 10 and carries, at its inner end, the key or lug 11, which is retained in position to engage with the notch 12 in the side of the trap at the rear thereof to hold the trap in locked position as shown. The trap is centrally mounted on the transverse pivot or rod 13. The lips 14 and 15 of the trap and the corresponding edge or opening of the block, are constructed as shown to limit the tilting movement of the trap. It will be seen that the coin pocket 16 is provided in the edge or side of the opening in the block and in front of the trap so that when the trap is tilted a coin placed thereon will slide or be thrown into the pocket as shown most clearly in Fig. 3.

The operation of my trick block will be readily understood from the foregoing description. The coin is exhibited as placed on the trap. The cover or cup 17 is then placed over the same and the trap is tilted by manipulation, that is pressure of the finger, and the coin is thus caused to slide into the pocket, whereupon the trap is brought back to its first position by pressure of the finger from below and pressure being removed from the button 10 of the locking rod the trap will be held in position while the coin will be out of sight. By again tilting the trap, after placing the cap on the block, and at the same time tilting the block in the opposite direction, the coin may be brought back and appear upon the surface of the block when the cap is again removed.

Having thus described my invention, I claim as new and desire to secure by Letters Patent:—

1. A trick block having the appearance of a plurality of sections, one of said sections consisting of a trap pivoted at its opposite sides, said block being provided with a concealed pocket the opening to which is normally closed by the front edge of the trap, the upper surface of the trap being adapted, by tilting the trap, to be brought into alinement with the lower edge of the opening to said pocket.

2. The combination with a block, of a trap pivoted therein and normally appearing as a portion of the block, a pocket adapted to receive a coin thrown from the upper surface of the trap when the trap is tilted, and means for locking and unlocking said trap.

3. The combination with a block, of a trap pivoted therein and normally appearing as a portion of the block, a receptacle or pocket adapted to receive a coin or token thrown from the trap when the trap is tilted, and locking and releasing mechanism adapted to be manipulated by the user for unlocking the trap when the trap is tilted and for securing the trap in place when restored to its normal position.

4. The combination with a block, of a trap pivoted therein and adapted to be tilted, means for limiting the tilting movement of the trap and a pocket in line with the surface of the trap when tilted, said trap being adapted to be restored to its normal position after being tilted, substantially as and for the purpose specified.

5. The trick block checked off as described and provided with a trap adapted to be tilted, said trap being adapted to hold a coin or token placed thereon and to cause the same to be thrown off when the trap is tilted, and a pocket in the block in line with the surface of the trap when tilted with mechanism for securing the trap in position to appear as a solid portion of the block, substantially as shown and described.

In witness whereof, I, hereunto subscribe my name this 5th day of April, A. D., 1912.

FREDERICK JAMES ROBINSON

Witnesses:
RAYMOND F. CALDWELL,
MARY A. CALDWELL.

---

Copies of this patent may be obtained for five cents each, by addressing the "Commissioner of Patents, Washington, D. C."